UNITED STATES PATENT OFFICE.

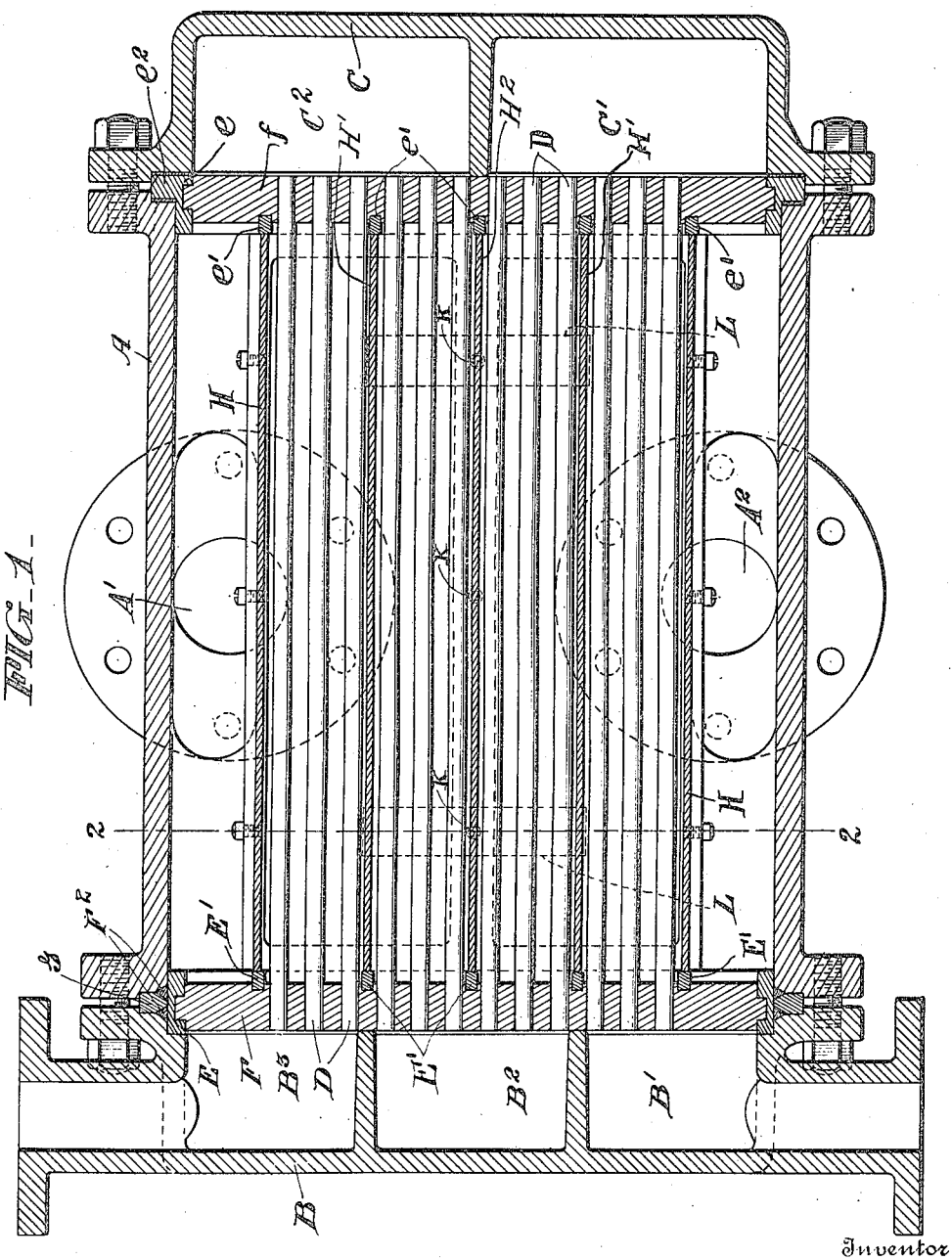

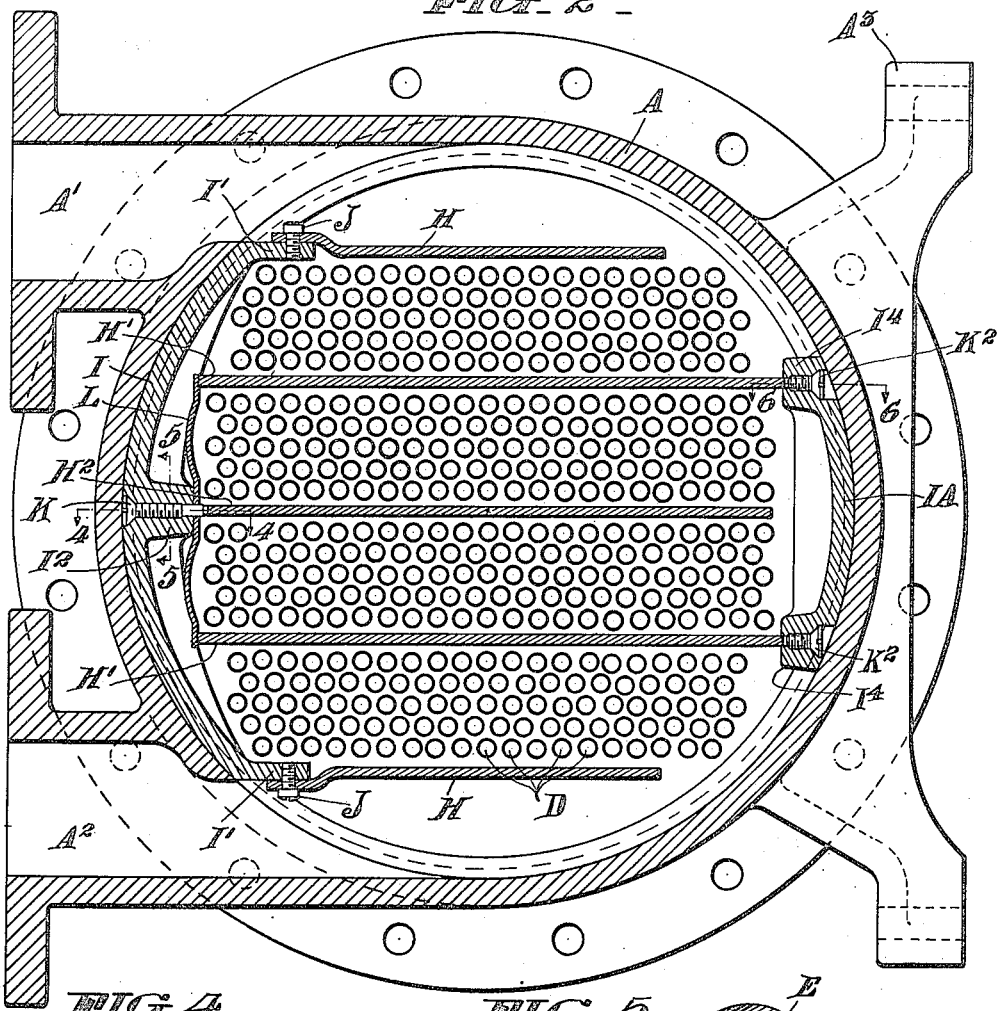
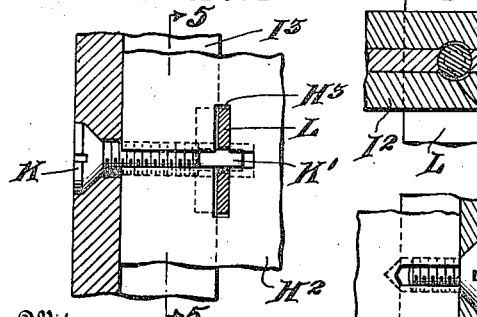
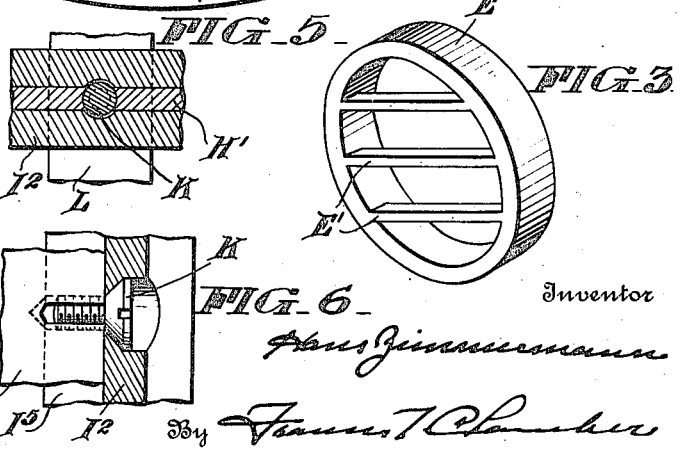

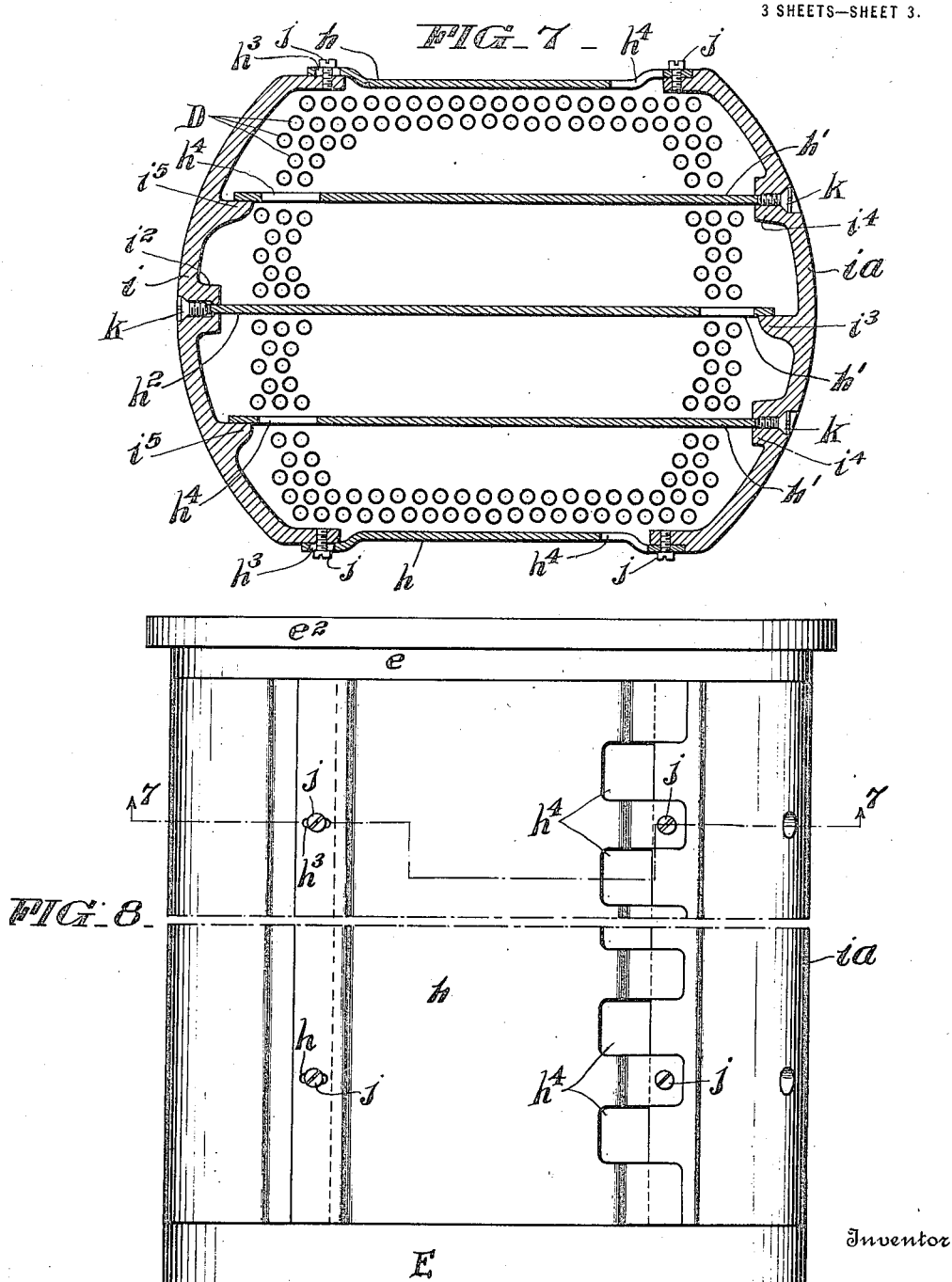

HANS ZIMMERMANN, OF PHILADELPHIA, PENNSYLVANIA, ASSIGNOR TO SCHUTTE & KOERTING COMPANY, OF PHILADELPHIA, PENNSYLVANIA, A CORPORATION OF PENNSYLVANIA.

HEAT-EXCHANGING APPARATUS.

1,289,350.

Specification of Letters Patent. Patented Dec. 31, 1918.

Application filed September 21, 1916. Serial No. 121,343.

*To all whom it may concern:*

Be it known that I, HANS ZIMMERMANN, a subject of the German Empire, residing in the city and county of Philadelphia, in the State of Pennsylvania, have invented certain new and useful Improvements in Heat-Exchanging Apparatus, of which the following is a true and exact description, reference being had to the accompanying drawings, which form a part thereof.

My present invention relates to heat interchanging apparatus of the type in which a heat transfer is effected between a fluid in contact with the inner walls, and another fluid in contact with the outer walls of a group of tubes.

The general object of my invention is to provide improved baffle means for causing the fluid in contact with the outer walls of the tubes to flow in multiple passes, *i. e.*, in a zig-zag course through the intertube space. More specifically the object of my invention is to provide simple and effective baffle means especially adapted for use in and as a part of apparatus of the general type referred to, and in which the tubes are permanently connected to the tube sheets and with the latter and the baffle means form a unit bodily insertible in and removable from the casing which forms the outer wall of the intertube space, and in which the baffles make relatively tight joints with the tube sheets and the inclosing casing to prevent leakage or short circuits of the fluid about the baffles when the apparatus is operated under such conditions that the flow resistance creates a relatively large difference between the pressures of the fluid circulating through the intertube space at the inlet to, and outlet from said space.

The invention is of especial utility in the case of apparatus in which the tubes are relatively small and are relatively closely spaced together, and a very rapid circulation through the intertube space is had, to thereby obtain a relatively large heat transfer capacity per unit of bulk, as is desirable in condensers and coolers employed in submarines, air-craft and other installations where economy in bulk and weight of such apparatus is highly desirable.

The various features of novelty which characterize my invention are pointed out with particularity in the claims annexed to and forming a part of this specification.

For a better understanding of the invention, however, and the advantages possessed by it, reference should be had to the accompanying drawings and descriptive matter in which I have illustrated and described preferred embodiments of my invention.

Of the drawings:

Figure 1 is a longitudinal section of a preferred form of apparatus embodying my invention;

Fig. 2 is a section taken on the line 2—2 of Fig. 1;

Fig. 3 is a perspective view of a detail of construction employed;

Fig. 4 is an enlarged partial section on the line 4—4 of Fig. 2;

Fig. 5 is an enlarged partial section on the line 5—5 of Figs. 2 and 4;

Fig. 6 is an enlarged partial section on the line 6—6 of Fig. 2;

Fig. 7 is a transverse section through a modified form of apparatus, the section being taken on the line 7—7 of Fig. 8; and Fig. 8 is a plan view of the apparatus shown in section in Fig. 7.

In the drawings and referring first to the construction shown in Figs. 1 to 6, A represents the casing body of a heat exchanging device constructed in accordance with the present invention and particularly devised for use in cooling the lubricating oil of engines for submarines, though useful in other relations where a relatively large heat exchange for a given bulk of apparatus is desirable. Secured to the ends of the casing body A are chambered end members B and C. The chambers in the two end members are connected by the tubes D which are connected at their ends into tube sheets. The tube sheet adjacent the casing end member B comprises an outer ring E of cast iron, brass, or other suitable metal, and a body of metal F ordinarily having a lower melting point than the metal of the ring E and permanently connecting the adjacent ends of the tubes D to the ring E by being cast in place. The tube sheet to which the opposite ends of the tubes are connected is of essentially the same construction as the one first described except that the member $e$ replacing the ring E is formed with an outwardly extending rib or flange $e^2$ which is clamped between the casing body A and end member C while the cylindrical outer surface of the ring E has a sliding fit with the inner wall of the casing body A. F² represent packing rings, triangular in cross section, surrounding the ring E and clamped, one between a spacing ring G and the casing member A, and the other between the ring G and end member B.

The chambered end member B, in the particular construction shown, is provided with a lower inlet chamber B', an upper outlet chamber B³ and an intermediate chamber B², while the end member C is formed with lower and upper chambers C' and C². With this construction the fluid which passes through the tubes, that is, the cooling water in the use of the apparatus as an oil cooler, passes through the tubes in four passes. A' represents the inlet orifice and A² the outlet orifice formed in the casing body A for the fluid passing through the intertube space which in the particular use specified, is the oil to be cooled. In so far as already described, the apparatus embodies nothing now novel with me.

The baffling arrangement of the intertube space in the particular form of the invention illustrated in Figs. 1 to 6 comprises upper and lower baffle plates H and a central baffle plate. H² which are secured to a baffle support I, and intermediate baffle plates H' lying between the central baffle plate H² and the two baffle plates H which are connected to the baffle plate support IA. The baffle plate support I is in the form of a segment of a cylinder shaped to fit snugly against the inner wall of the casing body A at one side of the latter between the levels of the two baffle plates H. At its upper and lower edges the member I is provided with a longitudinally extending inwardly projecting flange I' parallel to the baffle plates I and to which the latter are secured as by means of the bolts J. Midway between its edges the baffle plate support I is formed with a longitudinally extending inwardly projecting rib formed with a channel snugly receiving the adjacent edge of the baffle plate H². The latter is secured in place by means of screws K which are received in unthreaded sockets formed in the support H and extending from the outer wall of the latter into intersection with the channel I³. These screws enter threaded openings formed for the purpose in the adjacent edge of the baffle plate H². Where it is desirable to have the diameter of the screws K greater than the thickness of the baffle plate, as is the case with the construction illustrated, the partial encircling of the screws by the threads of the openings in the plate gives ample strength to hold the baffle plate in place.

The baffle plate H² is formed adjacent the rib I², with slots H³ to receive the spring bars L which extend transversely to the baffle plates and bear at their ends against the adjacent edges of the baffle plates H'. As shown, there are two of these springs L arranged in line with a corresponding pair of screws K, and the latter have reduced extensions K' which pass through apertures formed for the purpose in the springs L and thus fix the latter in place in assembling the apparatus.

The baffle plate support IA is analogous in construction to the member I, but is a somewhat smaller segment of a cylinder, and bears against the opposite side of the inner wall of the casing member A. The member IA is formed with longitudinally extending internally grooved ribs I⁴ at its upper and lower edges in which the adjacent edges of the baffle plates H', and in which they are secured by screws K², as the plate H² is secured in place by the screws K. The free edges of each baffle plate is spaced away from the adjacent casing wall and baffle support to provide free communication between the intertube spaces in the banks of tubes above and below the baffle plates.

The baffle plates should fit snugly at their ends against the tube sheet portions of the apparatus and for this purpose the rings E and e are formed with integral transverse bars E' and e', respectively, against which the end edges of the baffle plates bear. By forming the tube sheet portions of the apparatus in this manner it is readily possible to face off the inner edges of the bars E' and e' at the same time that the bodies of the rings E and e are machined, as is necessary to fit them for use. This avoids difficulty which would be experienced if it were attempted to make the baffle plates fit snugly against the binding metal F which cannot readily be machined, and which would be difficult to cast with smooth bearings for the edges of the baffle plates.

In assembling the apparatus shown in Figs. 1 to 6 inclusive, after the tubes and tube sheets are united in the usual manner, and the baffle plates are secured to their segmental supports I and IA, the baffle plates are moved transversely into place between the corresponding banks of tubes D. The tubular unit comprising the tubes, tube sheets, baffle plates and baffle plate supports, are then moved endwise into the casing body A. In thus inserting the tubular element in the casing it will be understood, of course, that the end of the tubular element at which the end ring E is located, is the one first inserted in the casing body. The chambered end members C and B, gasket rings F² and spacing ring G are ordinarily secured in place after the unit comprising the tubes and baffle plates, etc., is inserted in the casing body. It is apparent, however, that when the character of the gaskets permit this, the end member B, gaskets F² and spacing ring G may be secured in place before the tube element is inserted, and to disassemble and reassemble the apparatus for inspection, cleaning or repairs it is then only necessary to remove the chambered end member C. The tubular element may thus be withdrawn and reinserted without removing the chambered end member B, and without loosening any of the pipe connections to the casing. In the assembled apparatus, the cylindrical outer surfaces of the baffle plate supports I and IA fit snugly against the inner wall of the casing and are snugly held in place by the springs L.

The described construction insures a practical avoidance of any short circuiting of the normal zig-zag path through the intertube space for the fluid entering the interior of the casing body through the inlet A' and leaving the latter through the outlet A², notwithstanding the substantial difference which may exist between the pressure in the inlet A' and the outlet A². This differential pressure in the case of apparatus operating under severe conditions is quite high; for example, in some uses of apparatus in which my present invention may be employed with advantage, this pressure differential amounts to thirty pounds per square inch.

The modification illustrated in Figs. 7 and 8 differs from that shown in Figs. 1 to 4 in that each baffle plate is engaged and supported by each of the two opposed baffle supports as is specially desirable in some cases, and particularly in apparatus of relatively large size. In the construction shown in Figs. 7 and 8, the tubes and the tube sheets to which the tubes are secured, may be identical in construction and arrangement with the form shown in Figs. 1 to 6. In Figs. 7 and 8 the upper and lower baffle plates $h$ are each rigidly connected as by screws $j$ to inturned flanges formed at the edges of the opposed segmental baffle plate supports $i$ and $ia$ as by screws $j$. The openings $h^3$ for the screws $j$ carried by the baffle plate support $i$ are elongated to permit of a slight adjustment of the baffle supports $i$ and $ia$ toward and away from one another. The central baffle plate $h^2$ is secured in a grooved rib $i^2$ of the support $i$, by screws $k$ substantially as the baffle plate H² is secured in the rib I² by the screws K in the construction first described. At its opposite edges the baffle plates $h^2$ rest upon a supporting rib $i^3$ provided on the inner side of the support $ia$. Similarly the baffle plates $h'$ are secured in grooved ribs $i^4$ carried by the support $ia$ by screws $k$ and each of the baffle plates $h'$ bears at its opposite edge against a corresponding supporting rib $i^5$ carried by the baffle support $i$. Each of the baffle plates is formed adjacent one edge with ports $h^4$ for the fluid passing through the intertube space and these ports are arranged to give the same zig-zag passage through the intertube space which is had with the form of apparatus shown in Figs. 1 to 6.

In assembling the apparatus shown in Figs. 7 and 8 the baffle plates $h'$ and $h^2$ are secured to the corresponding supports by the screws $k$ before the baffles are moved into the space provided for them between the banks of tubes. The baffle plates $h$ may be secured to one of the supports $i$ and $ia$ before the baffle plates $h'$ are moved into place, but cannot be secured to both supports $i$ until the baffles $h'$ and $h^2$ are moved into place between the corresponding banks of tubes. Before tightening up the bolts $j$ connecting the baffles $h$ to the support $i$, the two supports $i$ and $ia$ are carefully spaced at the exact distance apart necessary to fit the casing into which the tubular element is to be inserted. To disassemble the form of apparatus shown in Figs. 7 and 8 the tubular element is first withdrawn from the casing and then the screws passing through the slots $h^3$ are withdrawn, after which the supports $i$ and $ia$ are moved apart to draw the corresponding baffles out of the spaces between the different banks of tubes.

While in accordance with the provisions of the statutes I have illustrated and described the best forms of my invention now known to me, it will be apparent to those skilled in the art that changes may be made in the form of my invention without departing from its spirit and that some features of the invention may be used without a corresponding use of other features.

Having now described my invention, what I claim as new and desire to secure by Letters Patent, is:

1. In heat interchanging apparatus of the type specified, the combination with a casing of an element bodily insertible in and removable from the casing and comprising a plurality of tubes, tube sheets to which the opposite ends of the tubes are connected, baffles dividing the intertube space into a plurality of passes, and an opposed pair of baffle supports supporting said baffles and engaging the inner wall of the casing when said element is inserted therein.

2. In heat interchanging apparatus of the type specified, the combination of a casing comprising a body portion open at one end and a removable end member normally closing the open end of said body, of an element bodily insertible in and removable from the casing body through the open end thereof when said member is removed, and comprising tubes, tube sheets to which the ends of the tubes are connected, baffles dividing the intertube space into a plurality of passes and movable transversely to the length of the tubes into and out of place when said element is out of the casing, and provisions for maintaining a tight joint between one edge of each baffle and the adjacent wall of the casing body when said element is inserted in the latter.

3. In heat interchanging apparatus of the type specified, the combination of a casing comprising a body portion open at one end and a removable end member normally closing the open end of said body, of an element bodily insertible in and removable from the casing body through the open end thereof when said member is removed, and comprising tubes, and tube sheets to which the ends of the tubes are connected, one of said tube sheets having a sliding fit with the interior of said casing body and the other being adapted to be secured in fixed relation with the casing body at the open end thereof, said element also comprising baffles dividing the intertube space into a plurality of passes and movable transversely to the length of the tubes into and out of place when said element is out of the casing, and provisions for maintaining a tight joint between one edge of each baffle and the adjacent wall of the casing body when said element is inserted in the latter.

4. In heat interchanging apparatus of the type specified, the combination with a plurality of tubes, of a tube sheet to which one end of each tube is connected, said tube sheet consisting of a frame member formed of metal and comprising an annular portion forming the margin of the tube sheet and a transverse bar or chord portion, and a body of metal cast in place within the frame member about the tube ends and contacting with said bar or chord portion and serving to unite the latter to one another and to the frame member, and a baffle plate traversing the intertube space and bearing at one edge against said bar or chord portion.

5. In heat interchanging apparatus of the type specified, the combination with a plurality of tubes, of tube sheets to which the opposite ends of the tubes are connected, and a baffle plate traversing the intertube space between the tube sheets, each of the latter consisting of a frame member formed of metal and comprising an annular portion forming the margin of the tube sheet and a transverse bar or chord portion against which the corresponding end of the baffle plate abuts, and a body formed of cast metal cast in place within said frame member and about the tube ends and contacting with said bar or chord portion and serving to unite the tube ends to one another and to the frame member.

6. In heat interchanging apparatus of the type specified, the combination with a plurality of tubes, of tube sheets to which the opposite ends of the tubes are connected and each tube sheet consisting of a frame portion formed of metal and comprising an annular portion, which forms the margin of the tube sheet, and transverse bars or chords each projecting at its inner edge into the intertube space, each tube sheet also comprising a portion formed of metal cast about the tubes and rigidly connecting the latter to one another and to said frame member and in which the outer edges of said bars or chords are embedded, and baffle plates dividing the intertube space into a plurality of passes and fitting between corresponding bars or chord portions of the two tube sheets.

HANS ZIMMERMANN.